(12) United States Patent
Kopelman

(10) Patent No.: US 10,888,395 B2
(45) Date of Patent: Jan. 12, 2021

(54) MOLD AND ALIGNER WITH CUT LINE MARKINGS

(71) Applicant: Align Technology, Inc., San Jose, CA (US)

(72) Inventor: Avi Kopelman, Palo Alto, CA (US)

(73) Assignee: Align Technology, Inc., San Jose, CA (US)

( * ) Notice: Subject to any disclaimer, the term of this patent is extended or adjusted under 35 U.S.C. 154(b) by 631 days.

(21) Appl. No.: 15/730,626

(22) Filed: Oct. 11, 2017

(65) Prior Publication Data

US 2018/0116762 A1  May 3, 2018

Related U.S. Application Data

(60) Provisional application No. 62/414,361, filed on Oct. 28, 2016.

(51) Int. Cl.
| | | |
|---|---|---|
| *A61C 7/00* | (2006.01) | |
| *A61C 7/08* | (2006.01) | |
| *A61C 13/00* | (2006.01) | |
| *B33Y 50/02* | (2015.01) | |

(52) U.S. Cl.
CPC ............ *A61C 7/002* (2013.01); *A61C 7/08* (2013.01); *A61C 13/0004* (2013.01); *B33Y 50/02* (2014.12)

(58) Field of Classification Search
CPC ....... A61C 7/002; A61C 7/08; A61C 13/0004; B33Y 50/02
See application file for complete search history.

(56) References Cited

U.S. PATENT DOCUMENTS

| | | | | |
|---|---|---|---|---|
| 6,371,761 | B1 * | 4/2002 | Cheang | A61C 7/00 433/24 |
| 6,386,878 | B1 * | 5/2002 | Pavlovskaia | A61C 9/0046 433/215 |
| 6,409,504 | B1 * | 6/2002 | Jones | A61C 7/00 433/24 |
| 6,514,074 | B1 * | 2/2003 | Chishti | A61C 9/0046 433/24 |
| 6,688,886 | B2 * | 2/2004 | Hughes | A61C 7/00 433/24 |
| 7,040,896 | B2 * | 5/2006 | Pavlovskaia | A61C 7/002 433/215 |
| 7,711,447 | B2 | 5/2010 | Lu et al. | |
| 7,826,646 | B2 | 11/2010 | Pavlovskaia et al. | |

(Continued)

OTHER PUBLICATIONS

PCT International Search Report and the Written Opinion of the International Searching Authority for PCT/US2017/056812 dated Jan. 15, 2018.

*Primary Examiner* — Nicholas D Lucchesi
(74) *Attorney, Agent, or Firm* — Lowenstein Sandler LLP

(57) ABSTRACT

Embodiments relate to adding customized cut line information to a shell that is to be formed over mold of a dental arch. In one embodiment, a cut line is determined for the shell. A processing device determines one or more markings for the shell that will mark the cut line. The processing device determines one or more features to add to the mold over which the shell will be formed that will cause the shell to have the one or more markings. The processing device generates a digital model of the mold, the digital model comprising the one or more features, wherein the digital model is usable to manufacture the mold having the one or more features.

22 Claims, 10 Drawing Sheets

(56) References Cited

U.S. PATENT DOCUMENTS

| | | | |
|---|---|---|---|
| 7,840,373 B2 | 11/2010 | Culp et al. | |
| 7,899,221 B2 * | 3/2011 | Weber | A61C 13/0004 382/128 |
| 7,942,672 B2 | 5/2011 | Kuo | |
| 8,026,943 B2 * | 9/2011 | Weber | A61C 13/0004 348/77 |
| 8,155,780 B2 | 4/2012 | Lu et al. | |
| 8,897,902 B2 * | 11/2014 | See | G16B 5/00 700/56 |
| 9,364,296 B2 | 6/2016 | Kuo | |
| 9,403,238 B2 * | 8/2016 | Culp | B23K 26/0861 |
| 10,390,913 B2 * | 8/2019 | Sabina | A61C 9/0053 |
| 10,413,385 B2 * | 9/2019 | Sherwood | G16H 30/20 |
| 10,467,815 B2 * | 11/2019 | Marom | G06F 3/011 |
| 10,470,847 B2 * | 11/2019 | Shanjani | H04Q 9/00 |
| 10,482,192 B1 * | 11/2019 | Long | A61C 7/002 |
| 10,504,386 B2 * | 12/2019 | Levin | G06F 3/0481 |
| 10,509,838 B2 * | 12/2019 | Elbaz | H04N 13/254 |
| 10,517,482 B2 * | 12/2019 | Sato | A61C 7/08 |
| 10,524,881 B2 * | 1/2020 | Li | A61C 7/08 |
| 10,537,405 B2 * | 1/2020 | Choi | A61C 7/08 |
| 10,543,064 B2 * | 1/2020 | Kuo | A61B 6/12 |
| 10,548,700 B2 * | 2/2020 | Fernie | A61C 7/146 |
| 10,595,966 B2 * | 3/2020 | Carrier, Jr. | A61C 19/04 |
| 10,610,332 B2 * | 4/2020 | Wu | G06T 19/20 |
| 10,613,515 B2 * | 4/2020 | Cramer | B29C 64/393 |
| 10,624,722 B1 * | 4/2020 | Culp | B23K 26/0823 |
| 10,639,134 B2 * | 5/2020 | Shanjani | A61B 5/4547 |
| 2006/0093982 A1 * | 5/2006 | Wen | A61C 7/08 433/6 |
| 2006/0127859 A1 * | 6/2006 | Wen | A61C 13/0027 433/213 |
| 2008/0131846 A1 * | 6/2008 | Marshall | A61C 5/70 433/218 |
| 2008/0254402 A1 * | 10/2008 | Hilliard | A61C 7/08 433/24 |
| 2015/0335404 A1 | 11/2015 | Webber et al. | |
| 2016/0067013 A1 | 3/2016 | Morton et al. | |
| 2016/0128803 A1 | 5/2016 | Webber et al. | |

* cited by examiner

MOLD AND ALIGNER WITH CUT LINE MARKINGS

RELATED APPLICATIONS

This patent application claims the benefit under 35 U.S.C. § 119(e) of U.S. Provisional Application No. 62/414,361, filed Oct. 28, 2016, which is herein incorporated by reference.

TECHNICAL FIELD

Embodiments of the present invention relate to the field of rapid prototyping molds and, in particular, to a mold having cut line features that imprint a material thermoformed over the mold with cut line markings that show where to cut the material after thermoforming. Embodiments additionally relate to an orthodontic aligner with cut line markings that is either directly manufactured or manufactured by thermoforming a sheet of material over a mold having the cut line features.

BACKGROUND

For some applications, shells are formed around molds to achieve a negative of the mold. The shells are then removed from the molds to be further used for various applications. One example application in which a shell is formed around a mold and then later used is corrective dentistry or orthodontic treatment. In such an application, the mold is of a dental arch for a patient and the shell is an aligner to be used for aligning one or more teeth of the patient.

Molds may be formed using rapid prototyping equipment such as 3D printers, which may manufacture the molds using additive manufacturing techniques (e.g., stereolithography) or subtractive manufacturing techniques (e.g., milling). The aligners may then be formed over the molds using thermoforming equipment. Once the aligner is formed, a computer controlled 4-axis or 5-axis trimming machine (e.g., a laser trimming machine or a mill) is typically used to trim the aligner along a cut line. The trimming machine uses electronic data that identifies the cut line to trim the aligner. The cut line information is not transferred to either the molds or the aligners.

Rapid prototyping equipment and thermoforming equipment is compact equipment that may be possessed by laboratories, dentist offices, orthodontics offices, and so forth. However, a trimming machine such as a laser trimming machine or a mill trimming machine are large expensive machines that are not generally owned by laboratories, dentist offices or orthodontics offices. Accordingly, such laboratories, dentist offices, orthodontics offices, etc. may manually trim the aligner after it is thermoformed over the mold in a manner that might compromise the efficacy of the appliance or the comfort of the patient.

BRIEF DESCRIPTION OF THE DRAWINGS

The present invention is illustrated by way of example, and not by way of limitation, in the figures of the accompanying drawings.

DETAILED DESCRIPTION

Figure 1A:
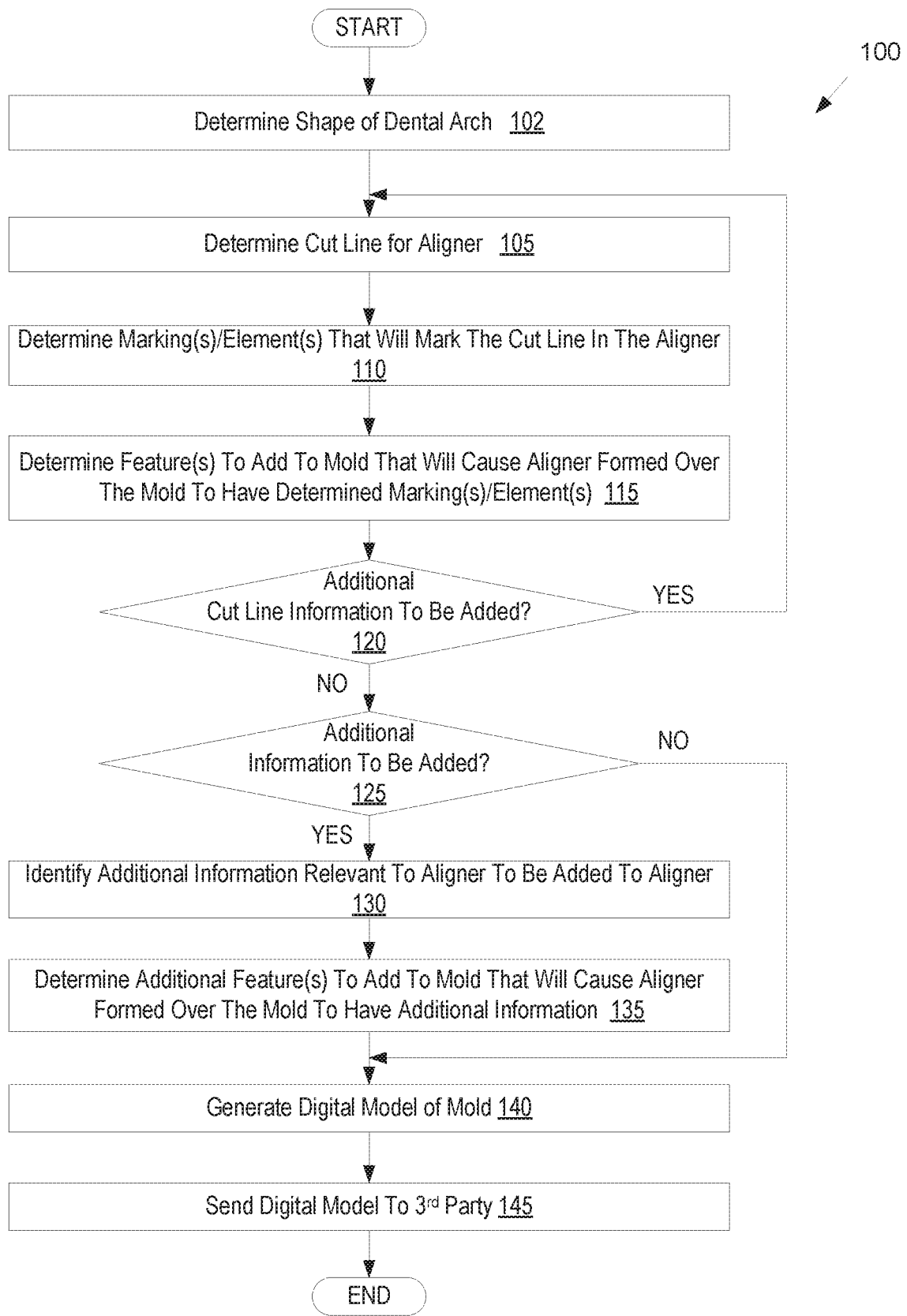
FIG. 1A illustrates a flow diagram for a method of fabricating a mold with features that imprint shells with cut line markings, in accordance with one embodiment.

Described herein are embodiments covering computer aided drafting (CAD) and computer aided manufacturing (CAM) systems that embed cut line information for shells such as orthodontic aligners into digital models of molds that are used to form the shells and/or into digital models of the shells. Traditionally aligners are trimmed by hand and there is no trim line information provided to facilitate trimming of the aligners. In some large production facilities, trimming is performed by machines using a customized trim line (also referred to as a cut line) determined by a large production facility. Embodiments described herein enable a large production facility to transfer the customized trim line information to smaller production facilities. For example, traditionally, a large production facility generates a digital model for a mold, manufactures the mold from the digital model, forms a shell over the mold, and then trims the shell along a cut line with a computer controlled mill or computer controlled laser cutting machine using an electronic file that contains information for the cut line. However, in some instances it can be useful for a third party such as a dental laboratory, clinician office or other smaller production facility to manufacture a shell based on a digital model received from an entity (e.g., large production facility) that generates the digital model. For example, an orthodontist or laboratory may want the ability to quickly replace a shell that is lost by a patient. The third party may receive the digital model of the mold, use the digital model and a rapid prototyping machine to form the mold, and then form the shell over the mold. Such a third party may lack a computer controlled mill machine or a laser cutting machine. Accordingly, a technician for the third party likely will manually trim the shell.

For shells such as orthodontic aligners, orthodontic retainers and orthodontic splints, the trimming of the shell is important to the efficacy of the shell for its intended purpose (e.g., aligning, retaining or positioning one or more teeth of a patient) as well as the fit of the shell on a patient's dental arch. For example, if too much of the shell is trimmed, then the shell may lose rigidity and an ability of the shell to exert force on a patient's teeth may be compromised. On the other hand, if too little of the shell is trimmed, then portions of the shell may impinge on a patient's gums and cause discomfort, swelling, and/or other dental issues. Additionally, if too little of the shell is trimmed at a location, then the shell may be too rigid at that location. Often, the optimal cut line is away from the gum line (also referred to as the gingival line) in some regions and on the gum line in other regions. For example, it may be desirable in some instances for the cut line to be away from the gum line (e.g., not touching the gum) where the shell will touch a tooth and on the gum line (e.g., touching the gum) in the interproximal regions between teeth. Accordingly, it is important that the shell be trimmed along a predetermined cut line. However, it can be very challenging for a technician to manually trim a shell along the intended cut line because there are not indicators of that cut line on the shell being trimmed.

A shell may additionally have multiple cut lines. A first or primary cut line may control a distance between an edge of the shell and a gum line of a patient. Additional cut lines may be for cutting slots, holes, or other shapes in the shell. For example, an additional cut line may be for removal of an occlusal surface of the shell, an additional surface of the shell, or a portion of the shell that, when removed, causes a hook to be formed that is usable with an elastic. This can further increase a difficulty of manually trimming the shell.

Accordingly, embodiments cover techniques for transferring the cut line information to the mold and/or to the shell that is to be trimmed. By transferring the cut line information to the shell that is to be trimmed, a technician is provided a guide for trimming the shell. This can greatly increase the accuracy for trimming the shell along the predetermined cut line.

In one embodiment, a cut line is determined for the shell. A processing device determines one or more markings for the shell that will mark the cut line. The processing device determines one or more features to add to a mold over which the shell will be formed that will cause the shell to have the one or more markings. The processing device then generates a digital model of the mold, the digital model comprising the one or more features, wherein the digital model is usable to manufacture the mold having the one or more features. When a third party receives the digital model, they may use it to manufacture the mold, and may then form the shell over the mold. The mold and/or the shell may include markings that indicate the correct cut line. A technician may then manually trim the shell along the intended cut line using the included markings. As a result, the finished product of the shell will fit a patient well and will function as it was designed to.

In another embodiment, a cut line is determined for a shell that is to be formed over a mold of a dental arch. A processing device determines one or more markings to add to the mold over which the shell will be formed that will cause the cut line to be visible while the shell is on the mold. The processing device then generates a digital model of the mold, the digital model comprising the one or more markings. The digital model is usable to manufacture the mold having the one or more markings. A technician may then manually trim the shell along the intended cut line while the shell is on the mold using the included markings in the mold. As a result, the finished product of the shell will fit a patient well and will function as it was designed to.

In another embodiment, one or multiple cut lines may be determined. Some cut line markings may ultimately be transferred to a shell that is formed. Other cut line markings may be in the mold, but may not be transferred to the shell.

In one embodiment, a processing device determines a cut line for an orthodontic aligner that is to be used for aligning one or more teeth of a patient. The processing device determines one or more markings or elements to add to the orthodontic aligner that will mark the cut line. The processing device then generates (or updates) a digital model of the aligner, the digital model comprising the one or more markings or elements, wherein the digital model is usable to manufacture the aligner.

Some embodiments are discussed herein with reference to orthodontic aligners (also referred to simply as aligners). However, embodiments also extend to other types of shells formed over molds, such as orthodontic retainers, orthodontic splints, sleep appliances for mouth insertion (e.g., for minimizing snoring, sleep apnea, etc.) and/or shells for non-dental applications. Accordingly, it should be understood that embodiments herein that refer to aligners also apply to other types of shells. For example, the principles, features and methods discussed may be applied to any application or process in which it is useful to transfer cut line information to shells that are form fitting devices such as eye glass frames, contact or glass lenses, hearing aids or plugs, artificial knee caps, prosthetic limbs and devices, orthopedic inserts, as well as protective equipment such as knee guards, athletic cups, or elbow, chin, and shin guards and other like athletic/protective devices.

Referring now to the figures, FIG. 1A illustrates a flow diagram for a method 100 of fabricating a mold with features that imprint shells such as aligners with cut line markings, in accordance with one embodiment. One or more operations of method 100 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 100 may be performed by a processing device executing a computer aided drafting (CAD) program or module such as model generator 650 of FIG. 6.

At block 102 of method 100, a shape of a dental arch for a patient at a treatment stage is determined based on a treatment plan. In the example of orthodontics, the treatment plan may be generated based on an intraoral scan of a dental arch to be modeled. The intraoral scan of the patient's dental arch may be performed to generate a three dimensional (3D) virtual model of the patient's dental arch. For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled. The negative mold may then be scanned to determine a shape of a positive mold that will be produced.

Once the virtual 3D model of the patient's dental arch is generated, a dental practitioner may determine a desired treatment outcome, which includes final positions and orientations for the patient's teeth. Processing logic may then determine a number of treatment stages to cause the teeth to progress from starting positions and orientations to the target final positions and orientations. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arch at that treatment stage may be generated. The shape of each virtual 3D model will be different. The original virtual 3D model, the final virtual 3D model and each intermediate virtual 3D model is unique and customized to the patient.

Accordingly, multiple different virtual 3D models may be generated for a single patient. A first virtual 3D model may be a unique model of a patient's dental arch and/or teeth as they presently exist, and a final virtual 3D model may be a model of the patient's dental arch and/or teeth after correction of one or more teeth ad/or a jaw. Multiple intermediate virtual 3D models may be modeled, each of which may be incrementally different from previous virtual 3D models.

Each virtual 3D model of a patient's dental arch may be used to generate a unique customized mold of the dental arch at a particular stage of treatment. The shape of the mold may be at least in part based on the shape of the virtual 3D model for that treatment stage. Aligners may be formed from each mold to provide forces to move the patient's teeth. The shape of each aligner is unique and customized for a particular patient and a particular treatment stage. In an example, the aligners can be pressure formed or thermoformed over the molds. Each mold may be used to fabricate an aligner that will apply forces to the patient's teeth at a particular stage of the orthodontic treatment. The aligners each have teeth-receiving cavities that receive and resiliently reposition the teeth in accordance with a particular treatment stage.

At block 105, processing logic determines a cut line for the aligner. This determination may be made based on the virtual 3D model of the dental arch at a particular treatment stage, based on a virtual 3D model of the aligner to be formed over the dental arch, or a combination of a virtual 3D model of the dental arch and a virtual 3D model of the aligner. Each aligner has a unique shape that is customized to fit over a patient's dental arch at a particular stage of orthodontic treatment. After an aligner is formed over a mold for a treatment stage, that aligner is subsequently trimmed along a cut line (also referred to as a trim line). The cut line may be a gingival cut line that represents an interface between an aligner and a patient's gingiva. The cut line controls a distance between an edge of the aligner and a gum line or gingival surface of a patient. Each patient has a unique dental arch with unique gingiva. Accordingly, the shape and position of the cut line will be unique and customized for each patient and for each stage of treatment. The location and shape of the cut line can be important to the functionality of the aligner (e.g., an ability of the aligner to apply desired forces to a patient's teeth) as well as the fit and comfort of the aligner. In one embodiment, the cut line covers the buccal, lingual and palatal regions of the aligner.

In accordance with one embodiment, the cut line is determined by first defining initial gingival curves along a line around a tooth (LAT) of a patient's dental arch from a virtual 3D model (also referred to as a digital model) of the patient's dental arch for a treatment stage. The gingival curves may include interproximal areas between adjacent teeth of a patient as well as areas of interface between the teeth and the gums. The initially defined gingival curves may be replaced with a modified dynamic curve that represents the cut line.

Defining the initial gingival curves along a line around a tooth (LAT) can be suitably conducted by various conventional processes. For example, such generation of gingival curves can include any conventional computational orthodontics methodology or process for identification of gingival curves. In one example, the initial gingival curves can be generated by use of the Hermite-Spline process. In general, the Hermite form of a cubic polynomial curve segment is determined by constraints on endpoints $P_1$ and $P_4$ and tangent vectors at endpoints $R_1$ and $R_4$. The Hermit curve can be written in the following form:

$$Q(s)=(2s^3-3s^2+1)P_1+(-2s^3+3s^2)P_4+(s^3-2s^2+s)R_1+(s^3-s^2)R_4;\ s[0,1] \quad (1)$$

Equation (1) can be rewritten as:

$$Q(s)=F_1(s)P_1+F_2(s)P_4+F_3(s)R_1+F_4(s)R_4; \quad (2)$$

Wherein equation (2) is the geometric form of the Hermite-Spline Curve, the vectors $P_1$, $P_4$, $R_1$, $R_4$ are the geometric coefficients, and the F terms are Hermite basis functions.

A gingival surface is defined by gingival curves on all teeth and a base line, with the base line being obtained from a digital model of the patient's dental arch. Thus, with a plurality of gingival curves and base line, a Hermite surface patch that represents the gingival surface can be generated.

Rather than having a cut line that causes a sharp point or other narrow region in the interproximal areas between teeth that can cause weakening of the aligner material during use, the initial gingival curves may be replaced with a cut line that has been modified from the initial gingival curves. The cut line can be generated to replace the initial gingival curves by initially obtaining a plurality of sample points from a pair of gingival curve portions residing on each side of an interproximal area. The sample points are then converted into point lists with associated geometric information (e.g., into the Amsterdam Dentistry Functional (ADF) format or other like data formats). Sample points may be suitably selected proximate the inner region between two teeth, but sufficiently distanced from where the two teeth meet or come to a point (or the separation between the two teeth narrows) within an interproximal area between the two teeth.

The collection of sample points provides a plurality of points in space (not in the same plane) that can be used to generate an average plane and a vector that is normal to the average plane. Sample points that are associated with gingival curve portions can then be projected onto the average plane to generate two new curves. To minimize weakening of a region of the aligner material within the interproximal area, the modified dynamic curve can be configured with an offset adjustment that comprises a minimum radius setting in the interproximal area to prevent breakage of the aligner material during use. The offset adjustment is further configured to ensure that a resulting cut line have a sufficient radius in the interproximal area to facilitate enough resistance force applied to the teeth to cause effective movement, but not too small radius as to facilitate breakage. For example, a sharp point or other narrow portion of material can create a stress region susceptible to break during use, and so should be avoided. Accordingly, rather than have the cut line comprise a sharp point or other narrow region, a plurality of intersection points and tangent points may be used to generate a cut line in the interproximal region between adjacent teeth that maintains structural strength of the aligner and prevents sharp points and/or narrow portions that could break. In one embodiment, the cut line is spaced apart from the gingival surface at regions where the aligner will contact a tooth and is designed to at least partially touch a patient's gingival surface in one or more interproximal regions between teeth.

At block 110, processing logic determines one or more markings and/or elements that will mark the cut line in the aligner. A marking in the aligner may be a visible indicator in the aligner for a cut line, where the visible indicator does not alter a shape or feel of the aligner. An element in the aligner that marks the cut line may be a positive or negative protrusion that does affect the shape of the aligner. Markings may remain in the aligner without affecting a fit of the aligner or a feel of the aligner when it is worn by a patient. However, elements added to the aligner may affect a fit and/or feel of the aligner unless trimmed off of the aligner.

Different types of markings may be determined for the cut line. Some examples of markings include shapes such as arrows, triangles, lines, etc. that point to a cut line. For example, the tips of the shapes (e.g., the tips of arrows) may mark the cut line. Other examples of markings include dashed or continuous lines. For example, a marking for a cut line may be a single line that a technician will cut along. In another example, a marking for a cut line may be two parallel lines, where a technician will cut between the two parallel lines. Other types of markings are also possible. Additionally, multiple different types of markings may be used to mark a single cut line. For example, a cut line might be marked by a combination of a first marking of a line and additional markings of arrows that point to the line.

In one embodiment, to define the markings to be used to show the cut line, processing logic determines a surface area on the aligner that is available for the markings. If there is a large surface area available, more markings may be used and/or larger markings may be used. Additionally, if there is a small amount of available surface area on the aligner, fewer markings may be used and/or smaller markings may be used. Moreover, the types of markings to be used may be limited if there is less than a threshold amount of available surface area on the aligner. For example, if shapes that point to the cut line are used to mark the cut line, then more shapes are generally used for sharper curves. If there is insufficient space on an aligner to include the multiple shapes, then an alternative form of marking such as a single line or pair of lines may be used.

At block 115, processing logic may determine an initial shape for a mold of the patient's dental arch at a treatment stage based on the digital model of the dental arch at that treatment stage. Processing logic may additionally determine one or more features to add to the mold that will cause the aligner formed over the mold to have the determined markings and/or elements. For example, one or more ridges or trenches may be added to the mold that will cause one or more lines to form in the aligner formed over the mold. The ridges and/or trenches may have a very small height/depth and/or thickness, such that the ridges and/or trenches will cause light to reflect off of and/or refract through the aligner formed over the mold in such a way to show the one or more lines. Similarly, other very shallow features having the shapes that are to be imprinted into the aligner may be added to the digital model for the mold. These features may cause the aligner formed over the mold to include the markings without affecting a shape and/or feel of the aligner.

For elements that are to be added to the aligner, the corresponding features added to the mold may have a depth, height and/or thickness that will affect a shape and/or feel of the aligner. Thus, the features for the elements are generally larger, thicker, deeper, etc. than the features for the markings. For example, a feature may be a trench or ridge that will cause a perceptible ridge or trench in the aligner. This ridge or trench in the aligner may be felt, and may be deep enough (or tall enough) to guide the movement of a blade in the hands of an operator.

At block 120, processing logic determines whether additional cut line information will be added to the aligner. As described above, the primary cut line defines a distance between an edge of the aligner and a gingival surface of a patient. The additional cut line may be for any other cuts, such as cutouts in the aligner. For example, an additional cut line may indicate an additional portion of the aligner to be removed such as for an occlusal surface of the aligner. Removal of the occlusal surface of the aligner for one or more teeth may enable contact between those teeth and teeth from an opposing dental arch. The additional cut line may also provide a cut out for one or more attachments on a patient's teeth (e.g., small, medium and/or large bumps, protrusions, wings, etc. that may be formed from a hard composite material that adheres to the patient's teeth). The additional cut line may also be a cut out to create a hook to be formed in the aligner, where the hook is usable with an elastic to apply additional forces to the patient's teeth. The additional cut line may also be for a cut out in the buccal surface of the aligner to improve patient comfort and/or to satisfy functional parameters. Other secondary cut lines may also be determined, such as to make a cut in the aligner for other purposes (e.g., to relieve a strength or rigidity of the aligner or to generate space for attachments on the aligner). In some instances, a cut may not remove material from the aligner.

If at block 110 it is determined that additional cut line information is to be added to the mold, the method returns to block 105, and the additional cut line is determined. If no additional cut line information is to be added to the mold, the method continues to block 125.

At block 125, processing logic determines whether additional information is to be added to the aligner. The additional information may be any information that pertains to the aligner. Examples of such additional information includes a patient name, a patient identifier, a case number, a sequence identifier (e.g., indicating which aligner a particular liner is in a treatment sequence), a date of manufacture, a clinician name, a logo and so forth.

Other additional information to add may be coordinate system reference marks usable to orient a coordinate system of a trimming machine (e.g., a laser trimming machine or a computer numerical control (CNC) machine) with a predetermined coordinate system of the aligner. By aligning the coordinate system of the trimming machine to the coordinate system of the aligner, an accuracy of computer controlled trimming of the aligner at the cut line may be improved. In one embodiment, the markings for the cut line act as the coordinate system reference marks. Alternatively, the coordinate system reference marks may be different than the markings for the cut line. If coordinate system reference marks are to be used that are different from the markings for the cut line, and the aligner is to be trimmed by a CNC or other computer controlled trimming machine, then the markings for the cut line may be omitted. Accordingly, in some such embodiments method 100 may skip the operations of blocks 110-120.

If additional information is to be added, the method continues to block 130. Otherwise the method proceeds to block 140.

At block 130, processing logic identifies the additional information that is relevant to the aligner and that is to be added to the aligner. At block 135, processing logic determines one or more additional features to add to the mold that will cause the aligner formed over the mold to have the additional information. For example, the additional features may be raised alphanumeric characters on the mold with a thickness and/or character width that is large enough to cause a visible marking on the aligner but small enough so as not to affect a shape and/or feel of the aligner.

At block 140, processing logic may determine a final shape for the mold and may generate a digital model of the mold. Alternatively, the digital model may have already been generated. In such an instance, processing logic updates the already generated digital model to include the determined features for the mold. The digital model may be represented in a file such as a computer aided drafting (CAD) file or a 3D printable file such as a stereolithography (STL) file. At block 145, the digital model for the mold may be sent to a third party. The digital model may include instructions that will control a fabrication system or device in order to produce the mold with specified geometries. That third party may then use the digital model to generate the mold having the added features.

Figure 1B:
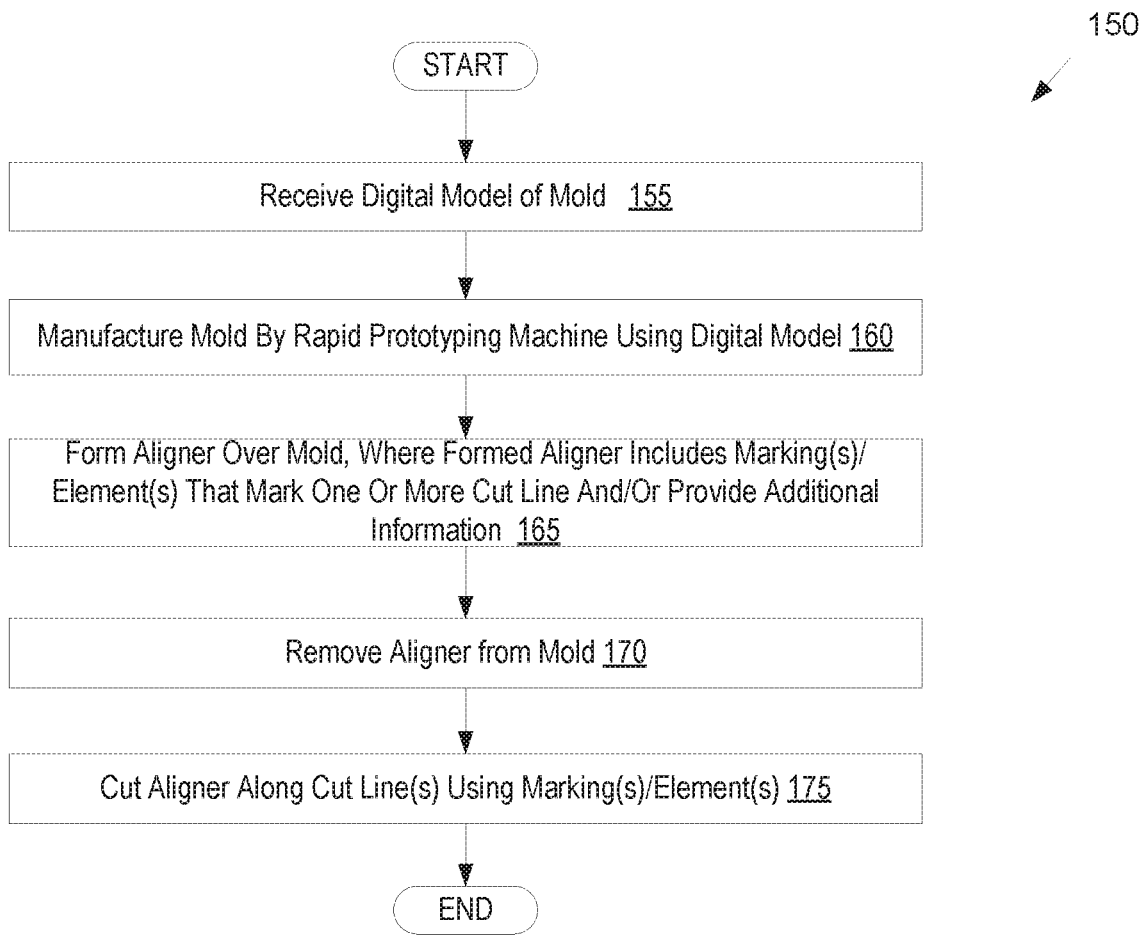
FIG. 1B illustrates a flow diagram for a method of trimming a shell using cut line markings imprinted in the shell, in accordance with one embodiment.

FIG. 1B illustrates a flow diagram for a method 150 of trimming a shell using cut line markings imprinted in the shell, in accordance with one embodiment. Method 150 may be performed, for example, by a laboratory or clinician office.

At block 155 of method 100, a clinician office, laboratory, or other entity receives a digital model of a mold, the digital model having been created as set forth in method 100. At block 160, the entity inputs the digital model into a rapid prototyping machine. The rapid prototyping machine then manufactures the mold using the digital model. One example of a rapid prototyping manufacturing machine is a 3D printer. 3D Printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In one embodiment, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

At block 165, the aligner is formed over the mold. The formed aligner includes the markings and/or elements that mark the one or more cut lines. The aligner may additionally include markings that provide additional information, such as the patient name, case number, and so on. In one embodiment, a sheet of material is pressure formed or thermoformed over the mold. The sheet may be, for example, a sheet of plastic (e.g., an elastic thermoplastic, a sheet of polymeric material, etc.). To thermoform the shell over the mold, the sheet of material may be heated to a temperature at which the sheet becomes pliable. Pressure may concurrently be applied to the sheet to form the now pliable sheet around the mold with the features that will imprint the markings and/or elements in the aligner. Once the sheet cools, it will have a shape that conforms to the mold. In one embodiment, a release agent (e.g., a non-stick material) is applied to the mold before forming the shell. This may facilitate later removal of the mold from the shell.

At block 175, the aligner is removed from the mold. At block 175, the aligner is then cut along the cut line (or cut lines) using the markings and/or elements that were imprinted in the aligner. In one embodiment, the aligner is manually cut by a technician using scissors, a bur, a cutting wheel, a scalpel, or any other cutting implement. If the cut line was marked using a single line, then the technician may cut along that line. If the cut line was marked using two lines that define the line, then the technician may cut between the two lines. If the cut line was marked using a plurality of shapes that point to the cut line, then the technician may cut between the shapes. If multiple cut lines are marked, then the technician may cut along each of the cut lines. In one embodiment, a first cutting implement is used to cut along a first cut line and a second cutting implement is used to cut along a second cut line.

In another embodiment, the aligner is cut along the cut line by a computer controlled trimming machine such as a CNC machine or a laser trimming machine. The computer controlled trimming machine may include a camera that is capable of identifying the cut line in the aligner. The computer controlled trimming machine may use images from the camera to determine a location of the cut line from markings in the aligner, and may control an angle and position of a cutting tool of the trimming machine to trim the aligner along the cut line using the identified markings.

Additionally, or alternatively, the aligner may include coordinate system reference marks usable to orient a coordinate system of the trimming machine with a predetermined coordinate system of the aligner. The trimming machine may receive a digital file with trimming instructions (e.g., that indicate positions and angles of a laser or cutting tool of the trimming machine to cause the trimming machine to trim the aligner along the cut line). By aligning the coordinate system of the trimming machine to the aligner, an accuracy of computer controlled trimming of the aligner at the cut line may be improved. The coordinate system reference marks may include marks sufficient to identify an origin and an x, y and z axis.

In one embodiment, prior to trimming the aligner a technician may apply a dye, a colored filler, or other material to the aligner to fill in slight indentations left by one or more elements imprinted in the aligner. The dye, colored filler, etc. may color the slight indentations without coloring a remainder of the aligner. This may increase a contrast between the cut line and the remainder of the aligner.

Figure 2A:
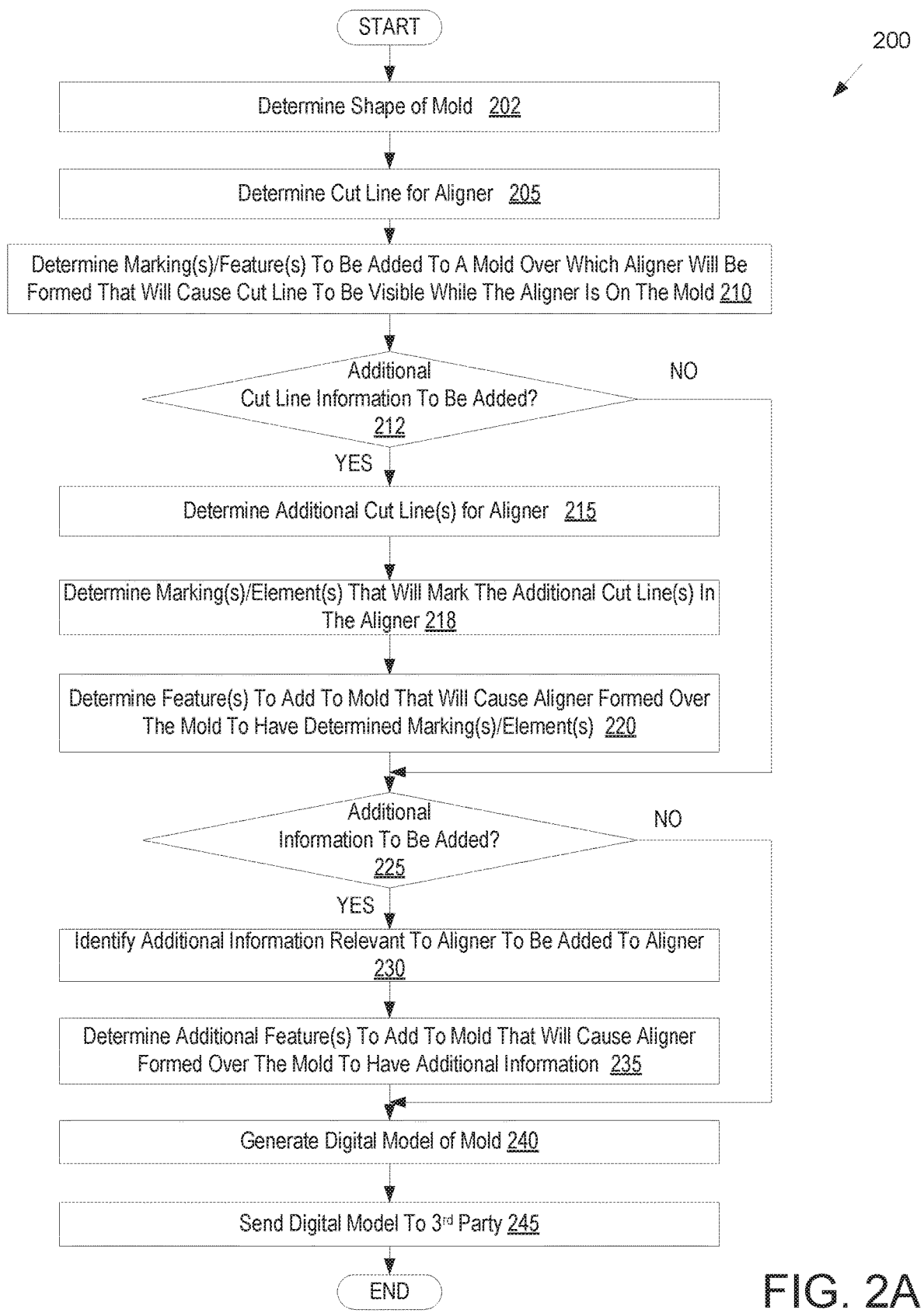
FIG. 2A illustrates a flow diagram for a method of fabricating a mold with cut line markings for a shell formed over the mold, in accordance with one embodiment.

FIG. 2A illustrates a flow diagram for a method 200 of fabricating a mold with cut line markings for a shell formed over the mold, in accordance with one embodiment. These cut line markings will not be transferred to the aligner formed over the mold. Because the aligner material is transparent, the markings can be seen through the aligner while the aligner is physically positioned on the shell. One or more operations of method 200 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 200 may be performed by a processing device executing a computer aided drafting (CAD) program or module such as model generator 650 of FIG. 6.

At block 202 of method 200, a shape of a mold and/or of a dental arch at a treatment stage is determined. In one embodiment, the shape is determined based on a scan of an object to be modeled (e.g., an intraoral scan of a patient's upper and/or lower dental arches as discussed above with reference to block 102 of method 100. Once the shape of a mold is determined, processing logic may perform operations to add cut line information to that mold, as set forth below. Alternatively, a shape of a dental arch may be determined, cut line information may be determined for an aligner, and then a shape for a mold may be determined after the cut line information is determined.

At block 205, processing logic determines a customized cut line for an aligner to be formed over the shell. The cut line may be a gingival cut line that represents an interface between an aligner and a patient's gingiva, as discussed above. The cut line may be determined as set forth with reference to method 100.

At block 210, processing logic determines one or more markings and/or features to add to the mold over which an aligner will be formed that will cause the cut line to be visible while the aligner is on the mold. A marking in the mold may be a visible indicator for a cut line, where the visible indicator does not alter a shape of the mold. Different types of markings may be determined for the cut line. Some examples of markings include shapes such as arrows, triangles, lines, etc. that point to a cut line. For example, the tips of the shapes (e.g., the tips of arrows) may mark the cut line. Other examples of markings include dashed or continuous lines. For example, a marking for a cut line may be a single line that a technician will cut along. In another example, a marking for a cut line may be two parallel lines, where a technician will cut between the two parallel lines. Other types of markings are also possible. Other examples of markings include an interface between two different materials and/or colors. For such an example, determining the markings and/or features to add to the mold includes determining a first portion of the mold to be manufactured using at least one of a first material or a first color and a second portion of the mold to be manufactured using at least one of a second material or a second color. An interface between the first portion of the mold and the second portion of the mold may define the cut line. Additionally, multiple different types of markings may be used to mark a single cut line.

At block 212, processing logic determines whether any additional cut line information for one or more additional cut lines is to be added to the mold and/or to the aligner that will be formed over the mold. If additional cut line is to be added, the method continues to block 215. If no additional cut line is to be added, the method proceeds to block 225.

At block 215, processing logic determines one or more additional cut lines for the aligner. The additional cut lines may be for cutouts in the aligner, to expose an occlusal surface, to expose an attachment on a tooth, to provide a point to secure an elastic and/or for other purposes discussed herein.

At block 218, processing logic determines one or more markings and/or elements in the aligner that will mark the one or more additional cut lines on the aligner. Alternatively, processing logic may determine one or more additional features in the mold that will cause markings for the one or more additional cut lines to be visible in the aligner while the aligner is on the mold.

In one embodiment, at block 220 processing logic determines one or more features to add to the mold that will cause the aligner formed over the mold to have the determined markings and/or elements, as discussed with reference to method 100. If all of the additional cut lines will be shown only in the mold and not in the aligner, then the operations of block 220 may be skipped.

At block 225, processing logic determines whether additional information is to be added to the aligner. The additional information may be any information that pertains to the aligner. Examples of such additional information includes a patient name, a patient identifier, a case number, a sequence identifier (e.g., indicating which aligner a particular liner is in a treatment sequence), a date of manufacture, a clinician name, a logo and so forth. If additional information is to be added, the method continues to block 230. Otherwise the method proceeds to block 240.

At block 230, processing logic identifies the additional information that is relevant to the aligner and that is to be added to the aligner. At block 235, processing logic determines one or more additional features to add to the mold that will cause the aligner formed over the mold to have the additional information. For example, the additional features may be raised alphanumeric characters on the mold with a thickness and/or character width that is large enough to cause a visible marking on the aligner but small enough so as not to affect a shape and/or feel of the aligner.

At block 240, processing logic generates a digital model of the mold. Alternatively, the digital model may have already been generated. In such an instance, processing logic updates the already generated digital model to include the determined features for the mold. The digital model may be represented in a file such as a computer aided drafting (CAD) file or a 3D printable file such as a stereolithography (STL) file. At block 245, the digital model for the mold may be sent to a third party. That third party may then use the digital model to generate the mold having the added features.

Figure 2B:
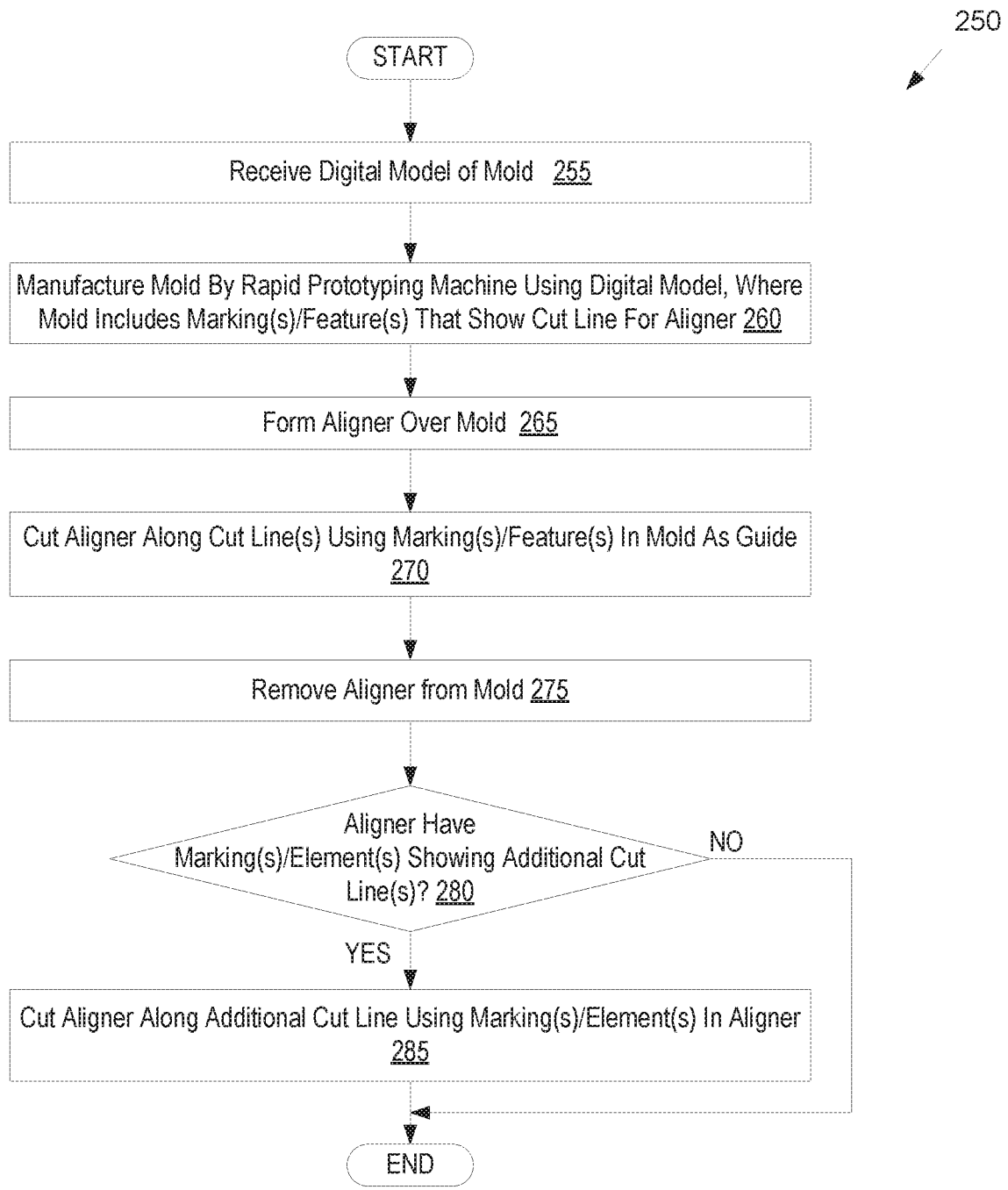
FIG. 2B illustrates a flow diagram for a method of trimming a shell using cut line markings in a mold over which the shell is formed, in accordance with one embodiment.

FIG. 2B illustrates a flow diagram for a method 250 of trimming a shell using cut line markings in a mold over which the shell is formed, in accordance with one embodiment. Method 250 may be performed, for example, by a laboratory or clinician office.

At block 255 of method 200, a clinician office, laboratory, or other entity receives a digital model of a mold, the digital model having been created as set forth in method 200. At block 260, the entity inputs the digital model into a rapid prototyping machine. The rapid prototyping machine then manufactures the mold using the digital model. One example of a rapid prototyping manufacturing machine that may be used is a 3D printer. 3D printing may be performed using extrusion deposition, granular materials binding, lamination, photopolymerization, or other techniques.

Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Optionally, the rapid prototyping techniques described herein allow for fabrication of a mold including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials (e.g., resins, liquid, solids, or combinations thereof) from distinct material supply sources in order to fabricate an object from a plurality of different materials. Alternatively or in combination, a multi-material direct fabrication method can involve forming an object from multiple materials in a plurality of sequential manufacturing steps. For instance, a first portion of the object (e.g., a main portion of the mold) can be formed from a first material in accordance with any of the direct fabrication methods herein, then a second portion of the object (e.g., one or more markings on the mold that show the cut line) can be formed from a second material in accordance with methods herein, and so on, until the entirety of the object has been formed. The relative arrangement of the first and second portions can be varied as desired. In one embodiment, multi-material direct fabrication is used to cause a first material to be used for the markings of the cut line on the mold, and to cause one or more additional materials to be used for the remainder of the mold.

At block 265, the aligner is formed over the mold, such as by pressure forming or thermoforming. At block 270, the aligner is manually cut along the one or more cut lines using the markings and/or features in the mold as a guide. The aligner may be cut or trimmed using cutting equipment such as a burr, a wheel saw, a scalpel, and so on.

At block 275, the aligner is removed from the mold. At block 280, a determination is made as to whether the aligner includes any markings and/or elements that show one or more additional cut lines. If so, the method continues to block 285. Otherwise the method ends.

At block 285, the aligner is then manually cut (e.g., by a technician) along the cut line (or cut lines) using the markings and/or elements that were imprinted in the aligner. The aligner may be cut using scissors, a bur, a cutting wheel, a scalpel, or any other cutting implement. In one embodiment, a first cutting implement (e.g., a burr, wheel saw or scalpel) is used to cut along a first cut line at block 270 and a second cutting implement (e.g., scissors) is used to cut along a second cut line at block 285. The aligner may additionally include markings that provide additional information, such as the patient name, case number, and so on.

In one embodiment, prior to trimming the aligner at block 285 a technician may apply a dye, a colored filler, or other material to the aligner to fill in slight indentations left by one or more elements imprinted in the aligner. The dye, colored filler, etc. may color the slight indentations without coloring a remainder of the aligner. This may increase a contrast between the cut line and the remainder of the aligner.

In the embodiments so far described, aligners and other shells are indirectly fabricated by first fabricating a mold, and then forming the aligner or other shell over the mold. In some embodiments, shells such as aligners may be directly fabricated using rapid prototyping techniques and a digital model of the aligner or other shell. For example, shells may be produced using direct fabrication, such as additive manufacturing techniques (e.g., 3D printing) or subtractive manufacturing techniques (e.g., milling). Direct fabrication of an aligner may involve forming the aligner without using a physical mold to define a geometry of the aligner. Some examples of rapid prototyping techniques include photopolymerization (e.g., stereolithograpy), material jetting (in which material is jetted onto a build platform using either a continuous or drop on demand approach), binder jetting (in which alternating layers of a build material and a binding material are deposited by a print head), fused deposition modeling, powder bed fusion, sheet lamination, and so on.

Figure 3:
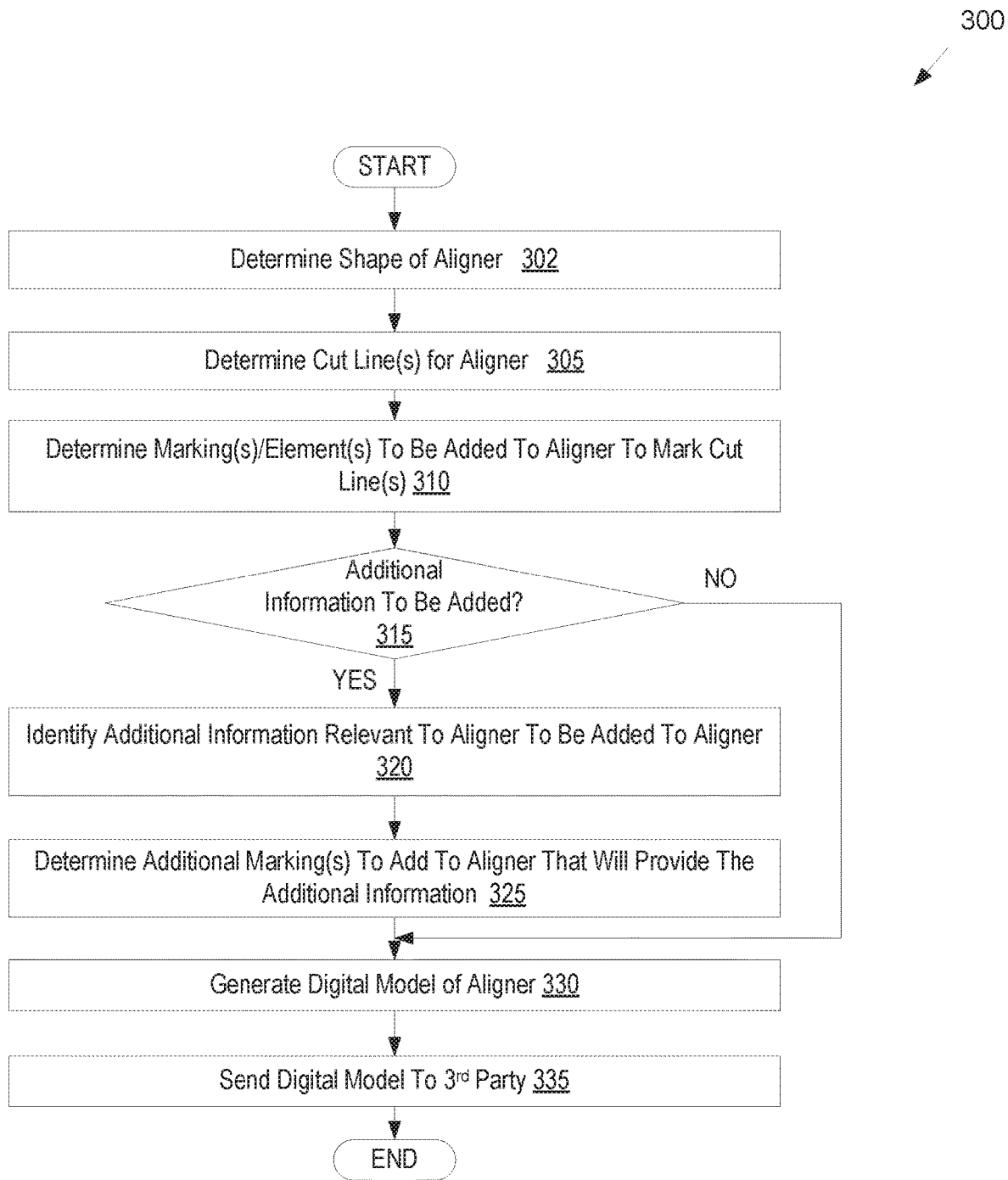
FIG. 3 illustrates a flow diagram for a method of directly fabricating an aligner or other shell with cut line markings, in accordance with one embodiment.

FIG. 3 illustrates a flow diagram for a method 300 of directly fabricating an aligner or other shell with cut line markings, in accordance with one embodiment. One or more operations of method 300 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 300 may be performed by a processing device executing a computer aided drafting (CAD) program or module such as model generator 650 of FIG. 6.

At block 302 of method 300, processing logic determines a shape for an aligner. In one embodiment, the shape is determined based on a scan of an object to be modeled. In the example of orthodontics, an intraoral scan of a patient's dental arch may be performed to generate a three dimensional (3D) virtual model of the patient's dental arch. In other applications, virtual 3D models may also be generated based on scans of an object to be modeled or based on use of computer aided drafting techniques (e.g., to design the virtual 3D mold). Alternatively, an initial negative mold may be generated from an actual object to be modeled. The negative mold may then be scanned to determine a shape of a positive mold that will be produced.

Referring back to the example of orthodontics, multiple different digital models of a patient's dental arch and/or teeth may be generated. A first digital model may be a model of a patient's dental arch and/or teeth as they presently exist, and a final digital model may be a model of the patient's dental arch and/or teeth after correction of one or more teeth and/or a jaw. Multiple intermediate digital models may also be generated, each of which may be incrementally different from previous digital models. For each digital model of a dental arch and/or teeth, a corresponding digital model of an aligner that fits over the dental arch and/or teeth is also generated. A separate digital model may be generated for each aligner. Each digital model of an aligner may be a 3D virtual model that represents an aligner to be used to reposition a patient's teeth at a particular phase of treatment.

At block 305, processing logic determines one or more cut lines for an aligner. As set forth above, a cut line may define an interface between an edge of the aligner and a gingival line of the patient. A cut line may additionally or alternatively define one or more cut outs for the aligner, such as to expose an occlusal surface of a tooth, to expose an attachment to a tooth, to provide an anchor point for an elastic, and so on.

At block 310, processing logic determines one or more markings and/or elements to be added to the aligner to mark the one or more cut lines. The markings may be a single line (e.g., that will be cut along), a pair of lines (e.g., where a technician will cut between the lines), a plurality of shapes that point to the cut line, and so on. The markings may be produced by using a first material and/or color for the markings and a second material and/or color for a remainder of the aligner. Accordingly, determining the markings may include determining which portions of the aligner will be manufactured with a first color and/or material, and which portions of the aligner will be manufactured with a second color and/or material. Alternatively, the markings may be produced by adjusting a shape of the aligner. The shape may be adjusted enough to cause a marking, but not enough to cause a shape adjustment that can be felt. Alternatively, the shape may be adjusted by causing the aligner to be thinner or thicker at the area of the markings. For example, the shape may be adjusted to include a trench or ridge that follows the cut line. The shape may also be adjusted to add a perforation along the cut line.

Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the aligner. The materials used for direct fabrication can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing. Once cured, the materials herein can exhibit sufficient strength, stiffness, durability, biocompatibility, etc. for use in the aligner. The post-curing properties of the materials used can be selected according to the desired properties for the corresponding portions of the aligner.

In some embodiments, relatively rigid portions of the aligner can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate. In some embodiments, relatively elastic portions of the aligner can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an aligner including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials (e.g., resins, liquid, solids, or combinations thereof) from distinct material supply sources in order to fabricate an object from a plurality of different materials. Alternatively or in combination, a multi-material direct fabrication method can involve forming an object from multiple materials in a plurality of sequential manufacturing steps. For instance, a first portion of the object (e.g., a body of the aligner) can be formed from a first material in accordance with any of the direct fabrication methods herein, then a second portion of the object (e.g., markings for a cut line) can be formed from a second material in accordance with methods herein, and so on, until the entirety of the object has been formed. The relative arrangement of the first and second portions can be varied as desired, e.g., the first portion can be partially or wholly encapsulated by the second portion of the object. In one embodiment, multi-material direct fabrication is used to cause a first material to be used for the markings of the cut line on the aligner, and to cause one or more additional materials to be used for the remainder of the aligner.

At block 315, processing logic determines whether additional information is to be added to the aligner. The additional information may be any information that pertains to the aligner. Examples of such additional information include a patient name, a patient identifier, a case number, a sequence identifier (e.g., indicating which aligner a particular liner is in a treatment sequence), a date of manufacture, a clinician name, a logo and so forth. If additional information is to be added, the method continues to block 320. Otherwise the method proceeds to block 330.

At block 320, processing logic identifies the additional information that is relevant to the aligner and that is to be added to the aligner. At block 325, processing logic determines one or more additional markings to add to the aligner that will cause the aligner to have or provide the additional information. For example, the additional markings may be alphanumeric characters on the aligner.

At block 330, processing logic generates a digital model of the aligner. Alternatively, the digital model may have already been generated. In such an instance, processing logic updates the already generated digital model to include the determined markings and/or elements. The digital model may be represented in a file such as a computer aided drafting (CAD) file or a 3D printable file such as a stereolithography (STL) file. At block 335, the digital model for the aligner may be sent to a third party. That third party may then use the digital model to generate the aligner, and may then trim the aligner using the markings and/or elements formed in the aligner.

Figure 4A:
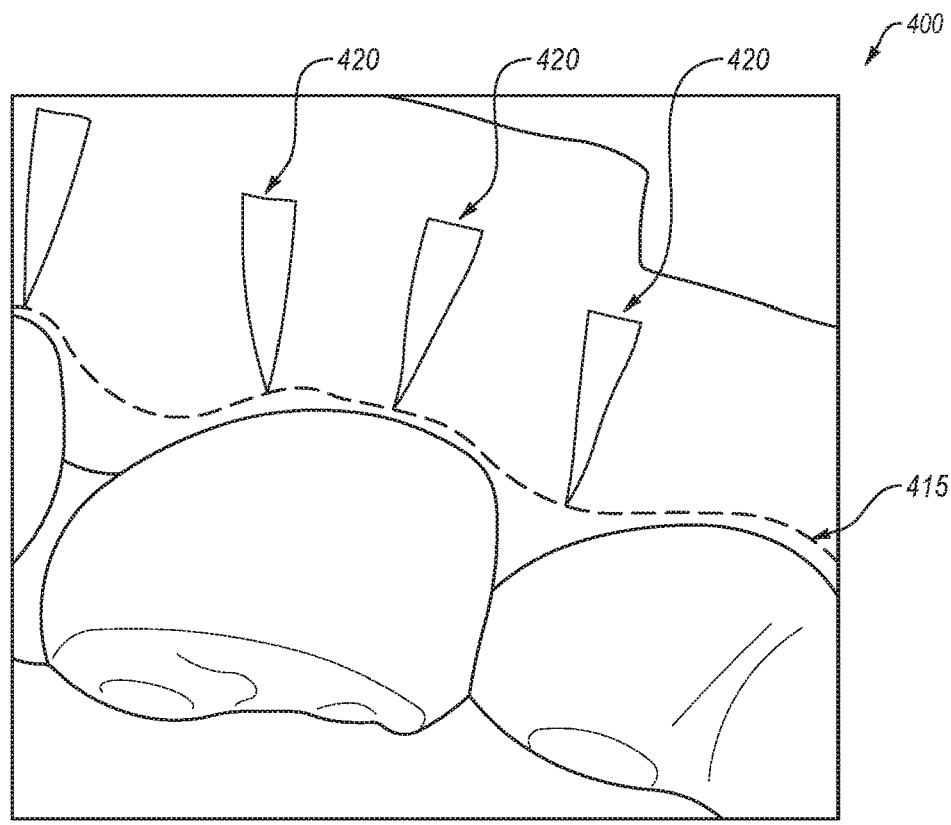
FIG. 4A illustrates a mold of a dental arch with markings that show a cut line for a shell formed over the mold, in accordance with one embodiment.

FIG. 4A illustrates a mold 400 of a dental arch with markings 420 that point to a cut line 415 (also referred to as a trimming line) for a shell formed over the mold 400. The markings 420 are triangles that point to the cut line 415. The markings 420 have been formed in the mold 400 using at least one of a different material or a different color than the material and/or color used to manufacture a remainder of the mold 400.

Figure 4B:
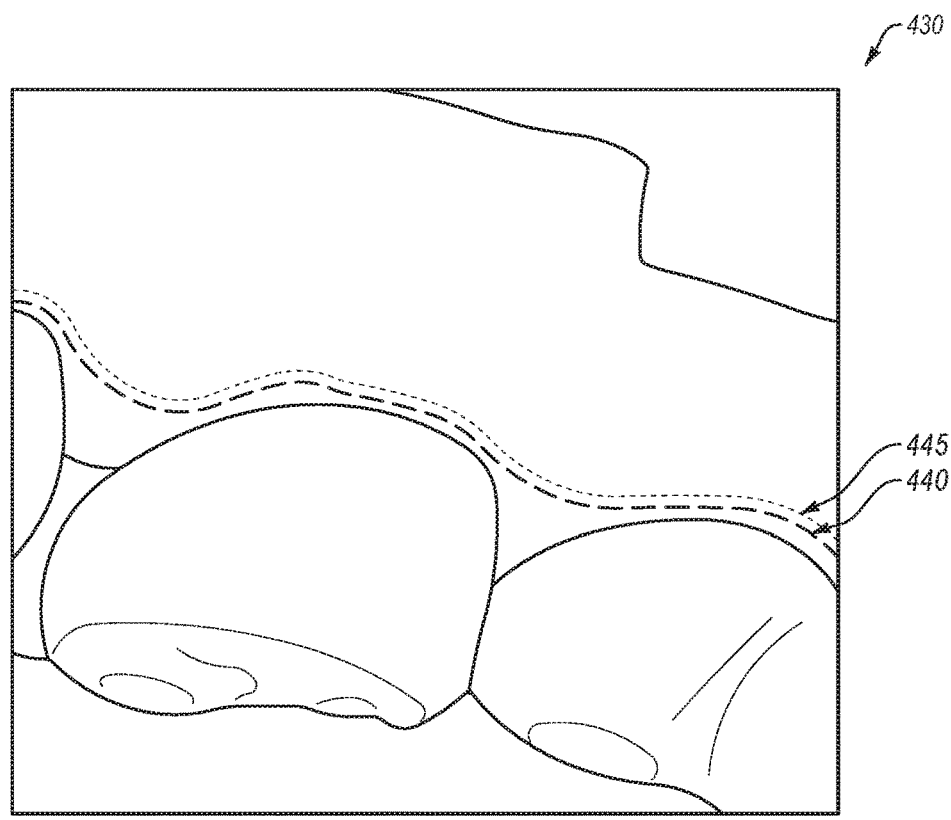
FIG. 4B illustrates a mold of a dental arch with markings that show a cut line for a shell formed over the mold, in accordance with another embodiment.

FIG. 4B illustrates a mold 430 of a dental arch with markings 445 that show a cut line 440 for a shell formed over the mold 400, in accordance with another embodiment. As shown, the markings 445 include a single line that has been formed in the mold 430 using at least one of a different material or a different color than the material and/or color used to manufacture a remainder of the mold 430.

Figure 4C:
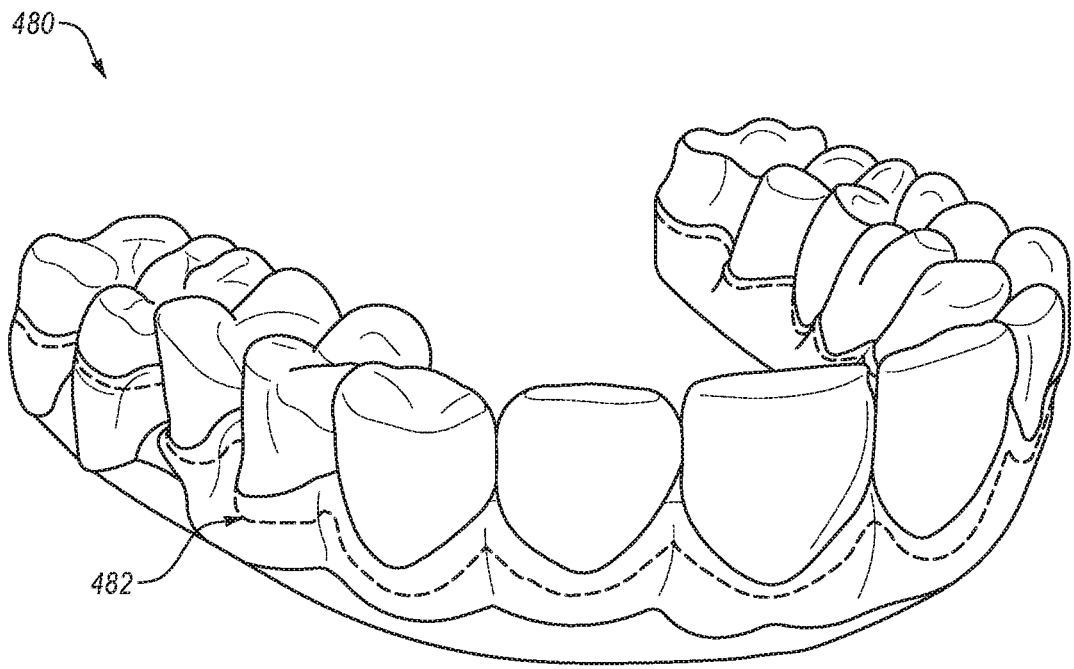
FIG. 4C illustrates a mold of a dental arch with features that will cause a shell formed over the mold to have cut line markings, in accordance with one embodiment.

FIG. 4C illustrates a mold 480 of a dental arch with features 482 that will cause a shell formed over the mold 480 to have cut line markings, in accordance with one embodiment. The features 482 include a single shallow ridge or trench in the illustrated example. As shown, the features 482 include a curved line that roughly follows a gingival line of the dental arch.

Figure 4D:
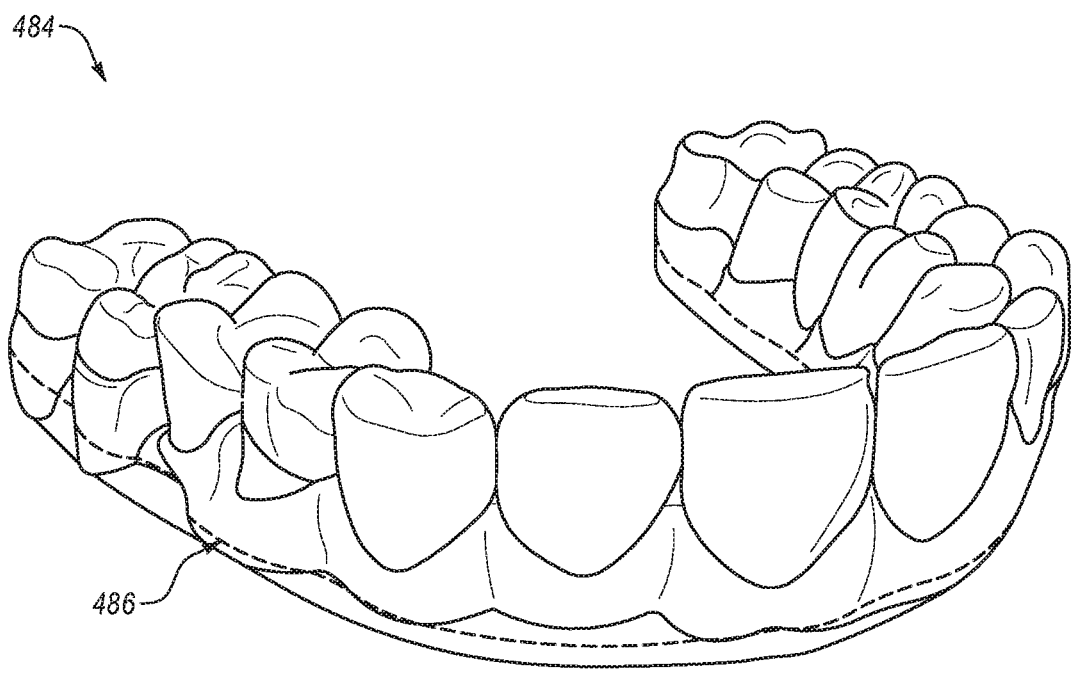
FIG. 4D illustrates a mold of a dental arch with features that will cause a shell formed over the mold to have cut line markings, in accordance with another embodiment.

FIG. 4D illustrates a mold 484 of a dental arch with features 486 that will cause a shell formed over the mold 484 to have cut line markings, in accordance with another embodiment. The features 486 include a single shallow ridge or trench in the illustrated example. As shown, the features 486 include an approximately straight line along the dental arch.

Figure 4E:
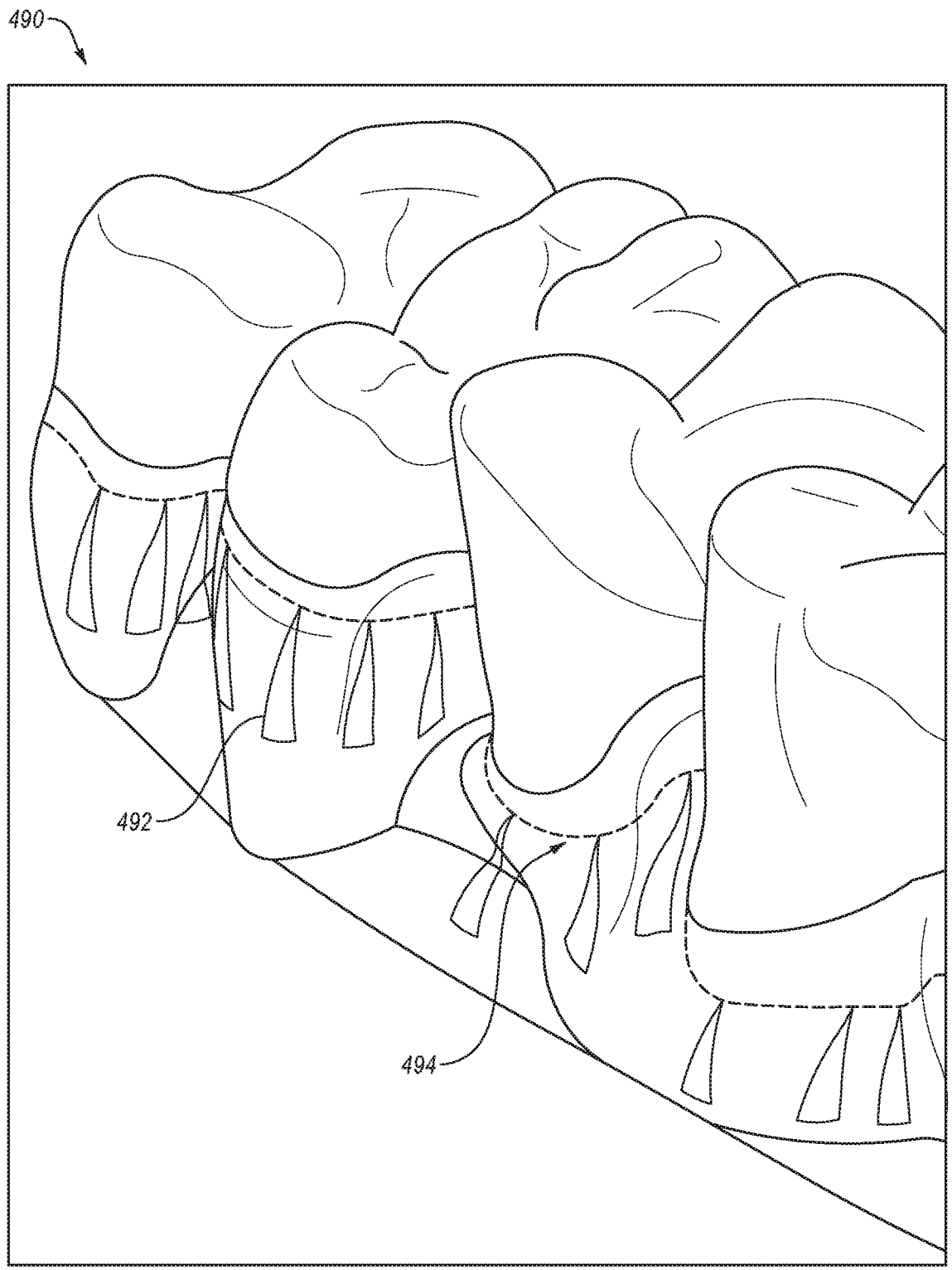
FIG. 4E illustrates a mold of a dental arch with features that will cause a shell formed over the mold to have cut line markings, in accordance with another embodiment.

FIG. 4E illustrates a mold 490 of a dental arch with features 492 that will cause a shell formed over the mold 490 to have cut line markings that follow a cut line 494, in accordance with another embodiment. As shown, the features 492 are triangles that point to the cut line 494.

Figure 5:
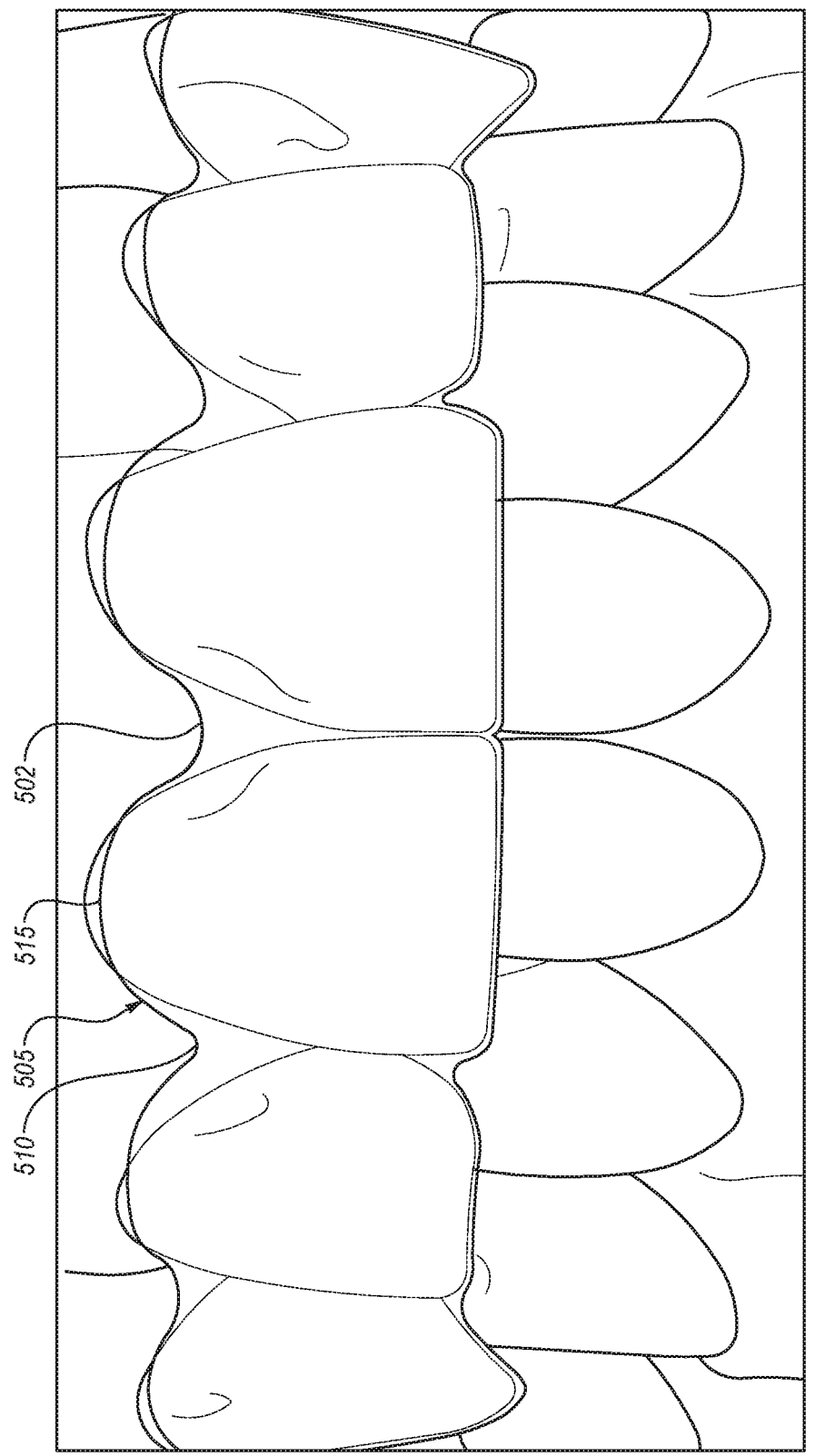
FIG. 5 illustrates an example orthodontic aligner worn by a person.

FIG. 5 illustrates an example orthodontic aligner 505 worn by a person. An edge 502 of the orthodontic aligner 505 has a wavy shape in which the aligner 505 is away from (or under) the gum line 515 where the aligner 505 touches a tooth and on (or over) the gum line 510 in the interproximal regions between adjacent teeth.

Figure 6:
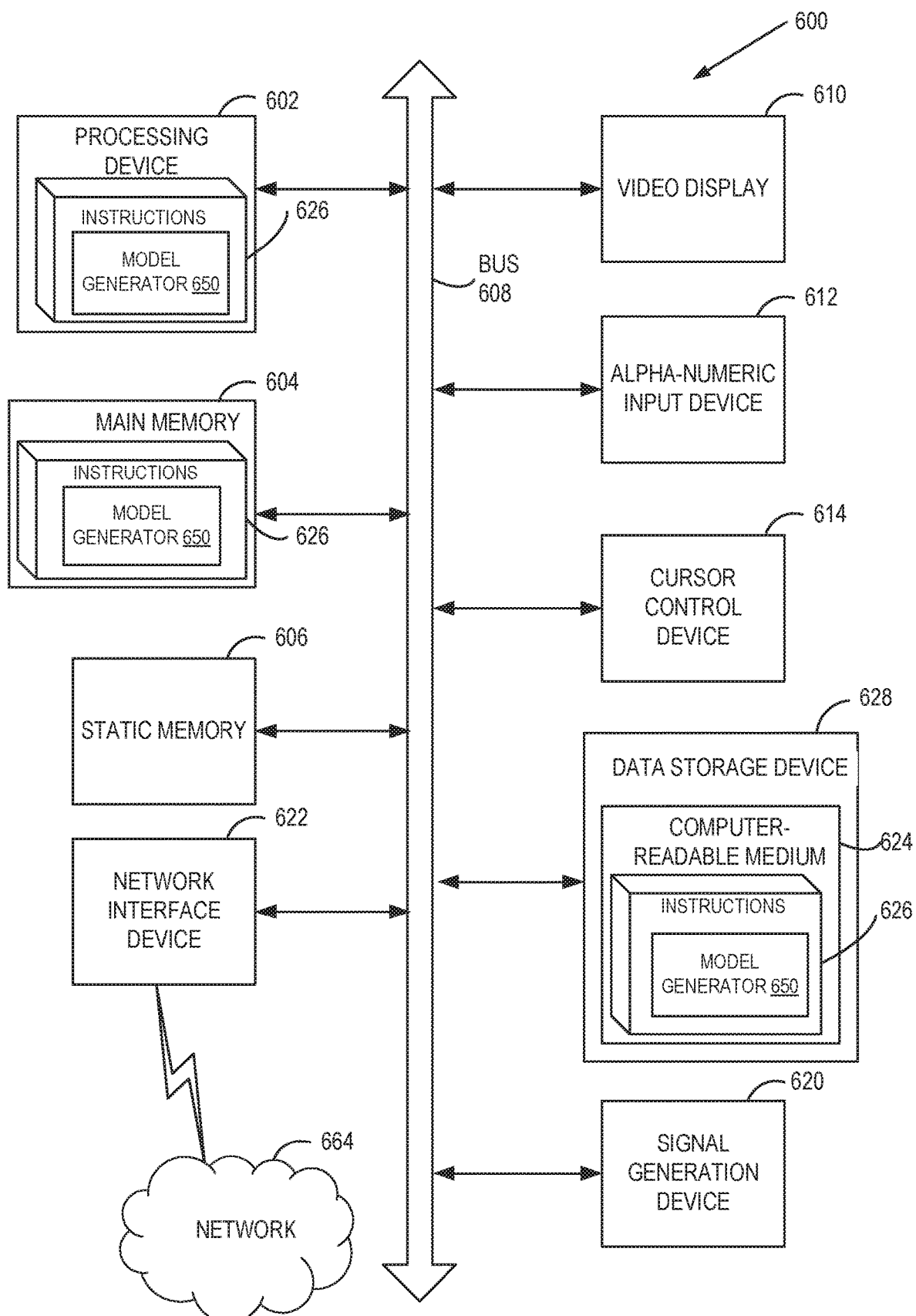
FIG. 6 illustrates a block diagram of an example computing device, in accordance with embodiments of the present invention.

FIG. 6 illustrates a diagrammatic representation of a machine in the example form of a computing device 600 within which a set of instructions, for causing the machine to perform any one or more of the methodologies discussed with reference to the methods of FIGS. 1A, 2A and 3. In alternative embodiments, the machine may be connected (e.g., networked) to other machines in a Local Area Network (LAN), an intranet, an extranet, or the Internet. For example, the machine may be networked to a rapid prototyping apparatus such as a 3D printer or SLA apparatus. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 628), which communicate with each other via a bus 608.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 626) for performing operations and steps discussed herein.

The computing device 600 may further include a network interface device 622 for communicating with a network 664. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 628 may include a machine-readable storage medium (or more specifically a non-transitory computer-readable storage medium) 624 on which is stored one or more sets of instructions 626 embodying any one or more of the methodologies or functions described herein. A non-transitory storage medium refers to a storage medium other than a carrier wave. The instructions 626 may also reside, completely or at least partially, within the main memory 604 and/or within the processing device 602 during execution thereof by the computer device 600, the main memory 604 and the processing device 602 also constituting computer-readable storage media.

The computer-readable storage medium 624 may also be used to store one or more virtual 3D models (also referred to as electronic models) and/or a mold generator 650, which may perform one or more of the operations of methods 100 and 200 described with reference to FIGS. 1A, 2A and 3. The computer readable storage medium 624 may also store a software library containing methods that call a model generator 650. While the computer-readable storage medium 624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    determining, by a processing device, a cut line for a shell that is to be formed over a mold of a dental arch of a patient, wherein the cut line is customized for the dental arch of the patient;
    determining, by the processing device, one more markings for the shell that will mark the cut line;
    determining, by the processing device, one or more features to add to the mold over which the shell will be formed that will cause the shell to have the one or more markings; and
    generating, by the processing device, a digital model of the mold, the digital model comprising the one or more features, wherein the digital model is usable to manufacture the mold having the one or more features.

2. The method of claim 1, wherein the shell comprises at least one of an orthodontic aligner, an orthodontic retainer or an orthodontic splint to be used for at least one of aligning, retaining, or positioning one or more teeth of a patient.

3. The method of claim 1, further comprising:
    manufacturing the mold by a rapid prototyping machine using the digital model, the mold comprising the one or more features;
    thermoforming or pressure forming a plastic sheet over the mold to form the shell, the shell comprising the one or more markings; and
    cutting the shell along the cut line using the one or more markings.

4. The method of claim 1, wherein the cut line controls a distance between an edge of the shell and a gum line of a patient.

5. The method of claim 4, further comprising:
    determining an additional cut line for the shell, wherein the additional cut line is for an additional portion of the shell to be removed;
    determining at least one of an additional marking or an element for the shell that will indicate the additional cut line; and
    determining one or more additional features to add to the mold over which the shell will be formed that will cause the shell to have at least one of the additional marking or the element;
    wherein the digital model further comprises the one or more additional features.

6. The method of claim 5, wherein the additional portion of the shell to be removed comprises at least one of an occlusal surface of the shell, an additional surface of the shell, or a portion of the shell that, when removed, causes a hook to be formed that is usable with an elastic.

7. The method of claim 5, wherein the one or more markings comprise a first type of marking and the additional marking comprises a second type of marking.

8. The method of claim 5, wherein the one or more additional features comprise at least one of a positive feature in the mold that causes a negative element in the shell or a negative feature in the mold that causes a positive element in the shell.

9. The method of claim 1, wherein the one or more markings comprise at least one of a single line that represents the cut line, a plurality of lines that define the cut line, or a plurality of shapes that point to the cut line.

10. The method of claim 1, further comprising:
    determining additional information that is included in an electronic file comprising at least one of data for the mold or data for the shell; and
    determining one or more additional features to add to the mold over which the shell will be formed that will cause the shell to include the additional information;
    wherein the digital model further comprises the one or more additional features.

11. The method of claim 10, wherein the additional information comprises at least one of a unique identifier for the shell, a case number, a patient name, or a logo.

12. The method of claim 1, wherein the one or more markings are visible in the shell but do not affect a shape of the shell.

13. A method comprising:
    determining, by a processing device, a cut line for a shell that is to be formed over a mold of a dental arch, wherein the cut line is customized for the dental arch;
    determining, by the processing device, one or more markings to add to the mold over which the shell will be formed that will cause the cut line to be visible while the shell is on the mold; and
    generating, by the processing device, a digital model of the mold, the digital model comprising the one or more markings, wherein the digital model is usable to manufacture the mold having the one or more markings.

14. The method of claim 13, further comprising:
    manufacturing the mold by a rapid prototyping machine using the digital model, the mold having the one or more markings;
    thermoforming or pressure forming a plastic sheet over the mold to form the shell;
    trimming the shell along the cut line using the one or more markings as a guide; and
    subsequently removing the shell from the mold.

15. The method of claim 13, further comprising:
    determining an additional cut line for the shell;
    determining one more additional markings for the shell that will mark the additional cut line; and
    determining one or more features to add to the mold over which the shell will be formed that will cause the shell to have the one or more additional markings;
    wherein the digital model further comprises the one or more features.

16. The method of claim 13, wherein determining the one or more markings comprises:
    determining a first portion of the mold to be manufactured using at least one of a first material or a first color; and
    determining a second portion of the mold to be manufactured using at least one of a second material or a second color, wherein an interface between the first portion of the mold and the second portion of the mold defines the cut line.

17. A computing device comprising:
    a memory; and
    a processing device operatively coupled to the memory, the processing device to:
        determine a cut line for a shell that is to be formed over a mold of a dental arch;

determine one or more markings for the shell that will mark the cut line;

determine one or more features to add to the mold over which the shell will be formed that will cause the shell to have the one or more markings; and generate a digital model of the mold, the digital model comprising the one or more features, wherein the digital model is usable to manufacture the mold having the one or more features.

18. The computing device of claim 17, wherein the processing device is further to:

determine an additional cut line for the shell, wherein the additional cut line is for an additional portion of the shell to be removed;

determine at least one of an additional marking or an element for the shell that will indicate the additional cut line; and determine one or more additional features to add to the mold over which the shell will be formed that will cause the shell to have at least one of the additional marking or the element;

wherein the digital model further comprises the one or more additional features.

19. The computing device of claim 17, wherein the processing device is further to:

determine additional information that is included in an electronic file comprising at least one of data for the mold or data for the shell; and determine one or more additional features to add to the mold over which the shell will be formed that will cause the shell to include the additional information;

wherein the digital model further comprises the one or more additional features.

20. The computing device of claim 17, wherein the processing device is further to:

determine an additional cut line for the shell;

determine a first portion of the mold to be manufactured using at least one of a first material or a first color; and determine a second portion of the mold to be manufactured using at least one of a second material or a second color, wherein an interface between the first portion of the mold and the second portion of the mold defines the additional cut line, wherein the digital model comprises instructions to form the first portion using at least one of the first material or the first color and to form the second portion using at least one of the second material or the second color.

21. A method comprising:

determining, by a processing device, a cut line for an orthodontic aligner that is to be used for aligning one or more teeth of a patient;

determining, by the processing device, one or more markings or elements to add to the orthodontic aligner that will mark the cut line; and generating, by the processing device, a digital model of the aligner, the digital model comprising the one or more markings or elements, wherein the digital model is usable to manufacture the aligner.

22. The method of claim 21, wherein determine the one or more markings comprises:

determining a first color or material to use for the one or more markings; and determining one or more additional colors or materials to use for a remainder of the orthodontic aligner.

* * * * *